US009426367B2

(12) United States Patent
Tanaka

(10) Patent No.: US 9,426,367 B2
(45) Date of Patent: Aug. 23, 2016

(54) BATTERY-OPERABLE ELECTRONIC APPARATUS AND METHOD FOR CONTROLLING THE SAME THAT EFFECTIVELY USE INFORMATION ON BATTERY USAGE

(71) Applicant: CANON KABUSHIKI KAISHA, Tokyo (JP)

(72) Inventor: Kentaro Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/579,468

(22) Filed: Dec. 22, 2014

(65) Prior Publication Data

US 2015/0189168 A1    Jul. 2, 2015

(30) Foreign Application Priority Data

Dec. 26, 2013  (JP) ................................ 2013-270129

(51) Int. Cl.
  *H04N 5/225*    (2006.01)
  *H04N 5/232*    (2006.01)
  *H04N 5/76*     (2006.01)

(52) U.S. Cl.
  CPC ...... *H04N 5/23241* (2013.01); *H04N 5/23293* (2013.01)

(58) Field of Classification Search
  CPC ........... H04N 5/23241; H04N 5/3698; G03B 2217/007; G03B 7/26

USPC ........... 348/231.99, 231.2, 231.3, 231.6, 372
See application file for complete search history.

(56) References Cited

U.S. PATENT DOCUMENTS

| 2005/0062878 | A1* | 3/2005 | Ogawa | H04N 5/232 348/372 |
| 2006/0033836 | A1* | 2/2006 | Umeyama | H04N 5/23241 348/372 |
| 2008/0007647 | A1* | 1/2008 | Masuda | H02J 7/0055 348/372 |
| 2010/0271508 | A1* | 10/2010 | Niizato | H04N 5/232 348/231.99 |
| 2011/0267433 | A1* | 11/2011 | Thorpe | G03B 35/08 348/47 |

FOREIGN PATENT DOCUMENTS

JP       4784490 B    10/2011

* cited by examiner

*Primary Examiner* — Kelly L Jerabek

(74) *Attorney, Agent, or Firm* — Cowan, Liebowitz & Latman, P.C.

(57) ABSTRACT

An electronic apparatus generates authentication data including information representing a time when authentication processing for identifying whether or not a battery in use is a genuine product is performed, and information representing a result of the authentication processing. Then, the electronic apparatus generates an image file that includes the authentication data based on image data obtained by shooting, and records the generated image file in at least one of a recording medium that is removable from the electronic apparatus and an external device with which the electronic apparatus is communicable.

10 Claims, 8 Drawing Sheets

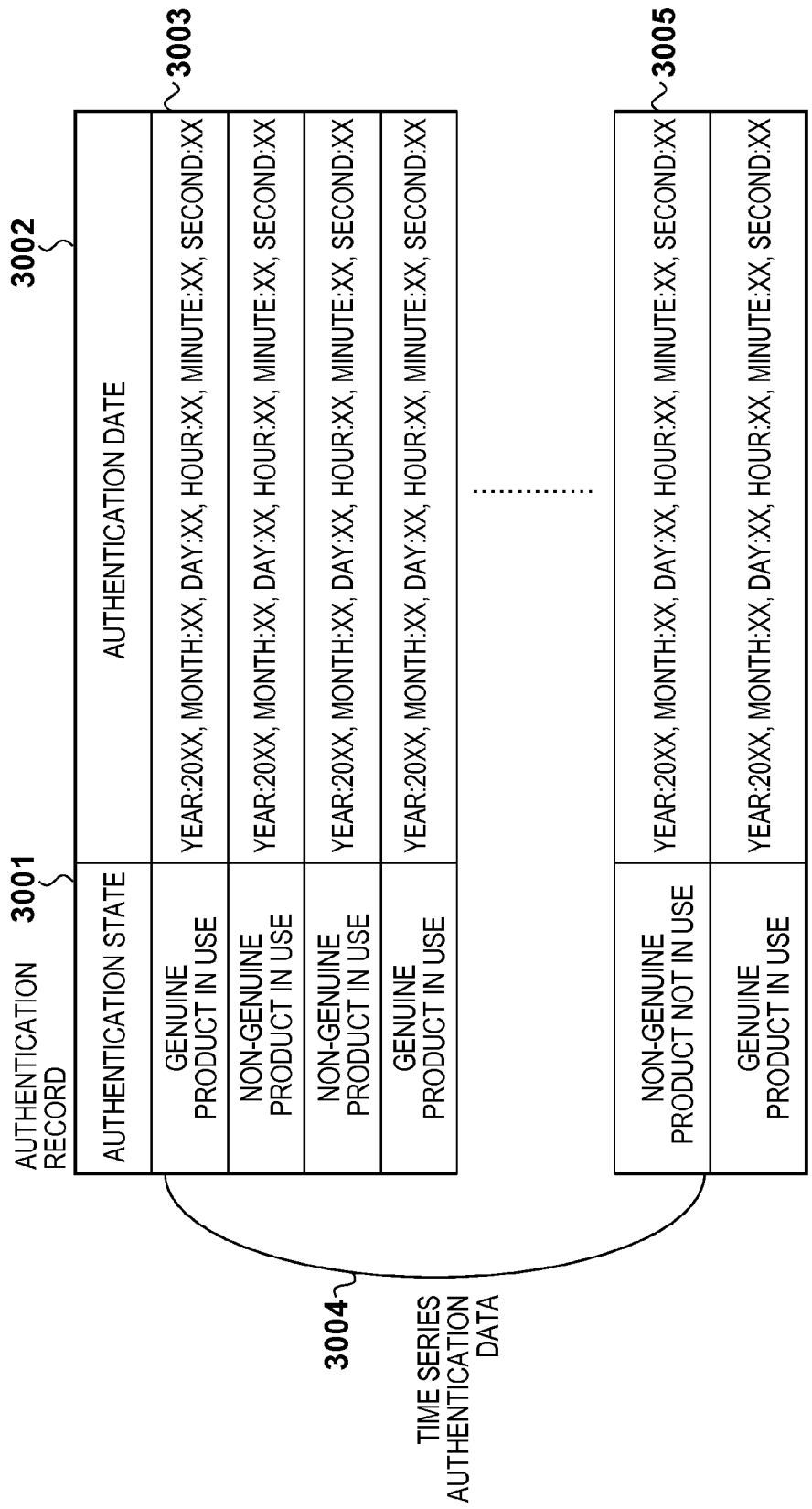

BATTERY-OPERABLE ELECTRONIC APPARATUS AND METHOD FOR CONTROLLING THE SAME THAT EFFECTIVELY USE INFORMATION ON BATTERY USAGE

BACKGROUND OF THE INVENTION

1. Field of the Invention

The present invention relates to an electronic apparatus and a method for controlling the same, and in particular to an electronic apparatus that has an image capture function and can be driven by a removable battery, and a method for controlling the same.

2. Description of the Related Art

Battery-operated electronic apparatuses such as digital cameras, portable media players, and mobile telephones are widely used, but some non-genuine batteries may cause abnormal operation or malfunction of the electronic apparatus.

Furthermore, some non-genuine batteries are counterfeit products of genuine batteries, and a user may use such a counterfeit product unintentionally (misrecognizing it as a genuine product). Accordingly, by informing the user of the fact that he or she is using a non-genuine battery product in the case of such a use, it is possible to prevent the user from unintentionally using the non-genuine product.

Japanese Patent No. 4784490 discloses an electronic apparatus that, when the battery in use is a non-genuine product, requires a user to input whether or not he or she recognizes the battery as a genuine product, and that, if the user recognizes the battery as a genuine product, informs the user of the fact that the battery is abnormal and forbids discharge.

Furthermore, Japanese Patent No. 4784490 also discloses that histories of battery authentication results, etc., are stored in a nonvolatile memory of a control circuit of the electronic apparatus.

In the electronic apparatus of Japanese Patent No. 4784490, it is possible to prevent a user from misrecognizing a non-genuine product as a genuine product. Furthermore, by reading the contents of the nonvolatile memory, it is possible to confirm a history of the used batteries.

A need to refer to that battery usage history may arise mainly when an electronic apparatus is inoperative or operates abnormally. However, in such a situation, it is difficult or impossible to perform reading itself of the history information stored in the nonvolatile memory of the control circuit as with the configuration of the above-referenced document, and thus there is the case where effective use of the history information cannot be made.

SUMMARY OF THE INVENTION

The present invention is made in view of the above-described problem of the conventional technique, and it is an object of the present invention to provide an electronic apparatus that can make effective use of information on a battery usage history and a method for controlling the same.

According to one aspect of the present invention, there is provided an electronic apparatus comprising: an image capture unit configured to output image data in response to a shooting instruction; an authentication unit configured to perform authentication processing for identifying whether or not a battery that is used in the electronic apparatus is a genuine product; an authentication data generating unit configured to generate authentication data that includes information representing a time when the authentication processing is performed, and information representing a result of the authentication processing; a file generating unit configured to generate an image file based on the image data that was output by the image capture unit; and a recording unit configured to record the image file in at least one of a recording medium that is removable from the electronic apparatus and an external device with which the electronic apparatus is communicable, wherein the file generating unit adds the authentication data to the image file.

According to another aspect of the present invention, there is provided a method for controlling an electronic apparatus including an image capture unit configured to output image data in response to a shooting instruction, the method comprising: an authentication step of performing authentication processing for identifying whether or not a battery that is used in the electronic apparatus is a genuine product; an authentication data generating step of generating authentication data that includes information representing a time when the authentication processing is performed, and information representing a result of the authentication processing; a file generating step of generating an image file based on the image data that was output by the image capture unit; and a recording step of recording the image file in at least one of a recording medium that is removable from the electronic apparatus and an external device with which the electronic apparatus is communicable, wherein, in the file generating step, the authentication data is added to the image file.

Further features of the present invention will become apparent from the following description of exemplary embodiments with reference to the attached drawings.

BRIEF DESCRIPTION OF THE DRAWINGS

FIG. 3 is a diagram schematically illustrating the format of authentication data generated by the digital camera according to the embodiment.

DESCRIPTION OF THE EMBODIMENTS

Preferred embodiments of the present invention will now be described in detail in accordance with the accompanying drawings.

An electronic apparatus according to the present invention is an electronic apparatus in which a rechargeable battery can be used as a power supply, and that has an image capture function (camera). Non-limited examples of such an electronic apparatus include a digital still camera, digital video camera, mobile telephone, personal computer (of a note book type, a tablet type, etc.), media player, game console, PDA, and drive recorder. However, the present invention is not limited to these. The following will describe embodiments in which the present invention is applied to a digital still camera (hereinafter, simply referred to as a digital camera).

Figure 1:
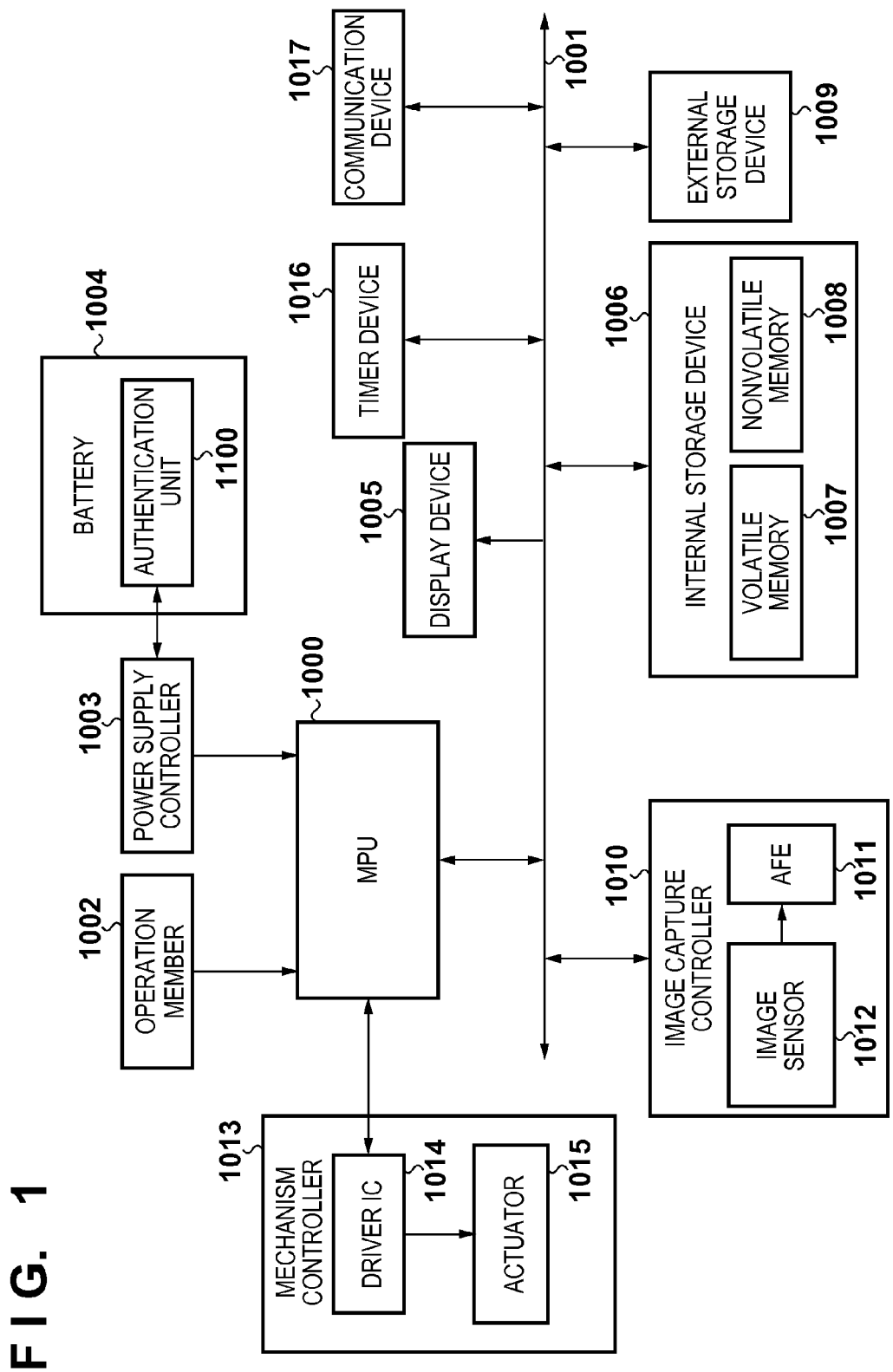
FIG. 1 is a block diagram illustrating an example of a functional configuration of a digital camera, serving as an example of an electronic apparatus according to embodiments.

FIG. 1 is a block diagram illustrating an example of a functional configuration of a digital camera, serving as an example of the electronic apparatus according to the embodiments of the present invention. An MPU 1000 controls functional blocks of the digital camera, and decides the digital camera operations including those described below. The MPU 1000 is connected to an operation member 1002, a power supply controller 1003, and a mechanism controller 1013 via dedicated communication ports.

The operation member 1002 is a user interface via which a user gives instructions, values and the like to the digital camera, and may be not only a physical input device, such as a switch, a button, keys, a lever, or a touch panel, but also an input device that uses sound or sight. The MPU 1000 is notified of an input that was received by the operation member 1002.

The power supply controller 1003 controls the charge operation of a battery 1004 that is mounted in the digital camera, monitors the voltage thereof, and intermediates communication between the battery 1004 and the MPU 1000. According to the present embodiment, the battery 1004, which serves as a secondary battery, has an authentication unit 1100, and communication between the authentication unit 1100 and the MPU 1000 is performed to execute authentication processing for determining whether or not the battery 1004 is a genuine product. Note that the authentication processing may also be performed by the power supply controller 1003.

The mechanism controller 1013 includes a driver IC 1014 and an actuator 1015, and controls operations of mechanisms of the digital camera, such as a focus lens, a diaphragm, a shutter, and a variable power lens, in accordance with the control of the MPU 1000.

The MPU 1000 is also connected, via a bus 1001, to a display device 1005, an internal storage device 1006, an external storage device 1009, an image capture controller 1010, a timer device 1016, and a communication device 1017.

The display device 1005 includes a flat display panel such as a LCD, and is used for displaying a GUI such as a menu screen, a live view image, an image read from the external storage device 1009, and the like.

The internal storage device 1006 includes a volatile memory 1007 and a nonvolatile memory 1008. The nonvolatile memory 1008 has stored, for example, programs that are executed by the MPU 1000, various types of setting values of the digital camera, image data for the GUI, and the like. Furthermore, the nonvolatile memory 1008 may also be used for storing image data obtained by shooting. The volatile memory 1007 is used as a work area when the MPU 1000 executes a program, or used for temporarily storing various types of data.

The external storage device 1009 is a recording medium that is removable from the digital camera, and may be, for example, a semiconductor memory card. The external storage device 1009 is used mainly as an archive destination for captured images. Note that the external storage device 1009 may also be configured to have the wireless communication function and to transfer a recorded image file to another device via wireless communication.

The image capture controller 1010 includes an image sensor 1012 and an analog front end (AFE) 1011. The image sensor 1012 has a configuration in which a plurality of pixels each having a photoelectric conversion element are arranged in an array, as with a CCD image sensor or a CMOS image sensor, for example. Each pixel of the image sensor 1012 outputs an electric signal according to an amount of light that was incident during an exposure time period. The exposure of the image sensor 1012 and reading of an electric signal is controlled by the MPU 1000. The AFE 1011 applies correlated double sampling, gain control, gamma correction, A/D conversion, or the like to an analog electric signal read from the image sensor 1012, and outputs the signal as a digital signal (image data). The MPU 1000 applies a so-called development procedure, such as white balance regulation or color interpolation processing, to image data and also applies encoding processing as needed, and then generates an image file of the type complying with the recording format. The MPU 1000 records the image file in the internal storage device 1006 or the external storage device 1009. Note that the image file may also be recorded in, in addition to or instead of the external storage device 1009, an external device via the communication device 1017. Furthermore, the MPU 1000 generates image data for display, and lets the display device 1005 display the generated image data, realizing a live view function and the like.

The timer device 1016 is, for example, a clock having a calendar function, and can provide information (date and time information) on date (year, month, day) and time (hour, minute, second).

The communication device 1017 enables the digital camera to communicate with an external device. The communication device 1017 can communicate with an external device by at least one of a wired method and a wireless method. Typical examples of wired communication include communication via Ethernet (registered trademark) and a USB, and typical examples of wireless communication include communication according to IEEE802.11x standard and the Bluetooth (registered trademark) standard, but any communication method may be used in the present embodiment.

Operation at the Time of Power-on

Figure 2:
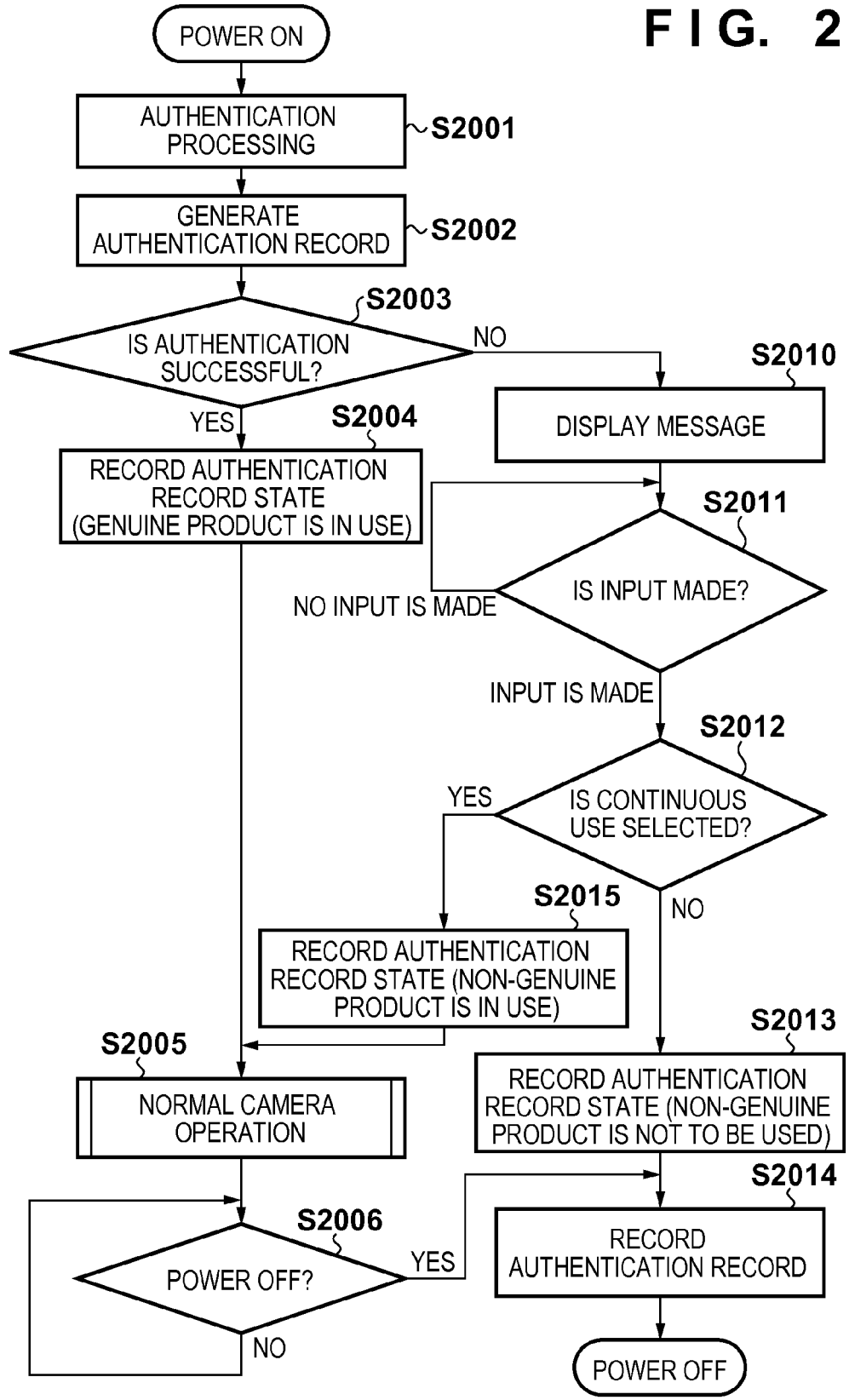
FIG. 2 is a flowchart illustrating an operation of battery authentication, of processing for activating a digital camera according to a first embodiment.

The following will describe the operation of battery authentication of activation processing of the digital camera of the present embodiment with reference to the flowchart of FIG. 2. In the flowchart of FIG. 2, the subject of the operation steps is the MPU 1000, unless otherwise noted.

Upon being instructed to turn on power via an operation of a power supply button or the like of the operation member 1002, the MPU 1000 lets the power supply controller 1003 supply power to the components. Furthermore, the MPU 1000 communicates with the authentication unit 1100 of the battery 1004 via the power supply controller 1003, and performs authentication processing for determining whether or not the mounted battery 1004 is a genuine product (S2001).

There is no particular limitation in the method for authenticating the battery 1004, and any authentication method can be used by which it can securely be determined whether or not the battery is a genuine product. For example, authentication can be performed such that the ID of the battery 1004 is encrypted using a secret key stored in the authentication unit 1100, and it is determined whether or not the ID that is obtained by decrypting the encrypted ID using a public key stored in advance in the nonvolatile memory 1008 of the digital camera is valid. If the ID cannot be decrypted and the obtained ID is not valid, the MPU 1000 determines that authentication fails (the battery 1004 is a non-genuine product). The MPU 1000 also determines that authentication fails, if the authentication unit 1100 of the mounted battery 1004 does not respond or communication complying with a predetermined authentication processing protocol is not possible.

Irrespective of the determination result, the MPU 1000 obtains, in step S2002, current date and time information from the timer device 1016, generates an authentication record 3003, and stores the generated authentication record in a given address in the volatile memory 1007. Note that the date and time information may be a part of information on year, month, day, hour, minute, and second that the timer device 1016 can provide, such as time (hour, minute, second), hour and minute, date, for example.

FIG. 3 is a diagram schematically illustrating the recording format for storing time series authentication data in the internal storage device 1006, the time series authentication data indicating an authentication result history. The time series authentication data 3004 includes at least one authentication record 3003, and each authentication record 3003 has an authentication state field 3001, in which information on the authentication result is stored, and an authentication date and time field 3002, in which information on date and time when authentication processing was performed is stored. Note that the authentication record 3003 has, at the time when being generated in step S2002, the authentication state field that is empty, and information is stored only in the authentication date and time field 3002. In the present embodiment, the authentication state field stores three types of information, namely, information representing that (1) a genuine product is used; (2) a non-genuine product is used with the user's understanding of this; and (3) use of a non-genuine product is cancelled, but the present invention is not limited to these. The authentication state field 3001 does not necessarily have to store the information of the format in which a person can directly understand the authentication result as shown in FIG. 3, and may store numerical values or reference signs that correspond to the above-described three states.

Note that, in the present embodiment, the authentication record 3003, at the time when being generated, is temporarily stored in the volatile memory 1007, and then is added to the time series authentication data 3004 stored in the nonvolatile memory 1008 or recorded in captured image data. These processes will be described in detail later.

In step S2003, if it is determined that the authentication processing executed in step S2001 is successful, the MPU 1000 advances the procedure to step S2004, and if it is determined that the authentication processing fails, the MPU 1000 advances the procedure to step S2010.

In step S2004, the MPU 1000 stores information representing that authentication is successful or a genuine product is in use in the authentication state field 3001 of the authentication record that was generated in step S2002 and stored in the volatile memory 1007, and then starts a normal camera operation in step S2005. If, during the normal camera operation, an instruction to turn off the power is input from the operation member 1002 (Yes in step S2006), the MPU 1000 advances the procedure to step S2014.

In step S2014, the MPU 1000 adds the authentication record 3003 stored at that time in the volatile memory 1007 to the time series authentication data 3004 stored in the nonvolatile memory 1008, and instructs the power supply controller 1003 to turn off the power.

On the other hand, if it is determined in step S2003 that the authentication processing fails, the MPU 1000 lets, in step S2010, the display device 1005 display a message for notifying a user of the fact that the mounted battery is not a genuine product. Note that the message display screen on which the message is here displayed is configured such that a user can input whether or not he or she will continue using the battery.

In step S2011, the MPU 1000 stands by until an input is made from a user via the operation member 1002, and if an input is made from a user, the procedure advances to step S2012. In step S2012, if it is determined that an input indicating that the user will continue using the battery with the understanding that the battery is a non-genuine product was made via the operation member 1002, the MPU 1000 advances the procedure to step S2015. In step S2015, the MPU 1000 stores information representing that a non-genuine product is in use in the authentication state field 3001 of the authentication record generated in step S2002, and starts the normal camera operation (S2005).

On the other hand, if it is determined in step S2012 that an input indicating that the user does not want to continue using the non-genuine product was made, the MPU 1000 advances the procedure to step S2013. In step S2013, the MPU 1000 stores information representing that a non-genuine product is not to be used in the authentication state field 3001 of the authentication record generated in step S2002. Then, the MPU 1000 adds the authentication record 3003 temporarily stored in the volatile memory 1007 to the time series authentication data 3004 stored in the nonvolatile memory 1008 (S2014), and instructs the power supply controller 1003 to turn off the power.

Image Capture Processing

Figure 5:
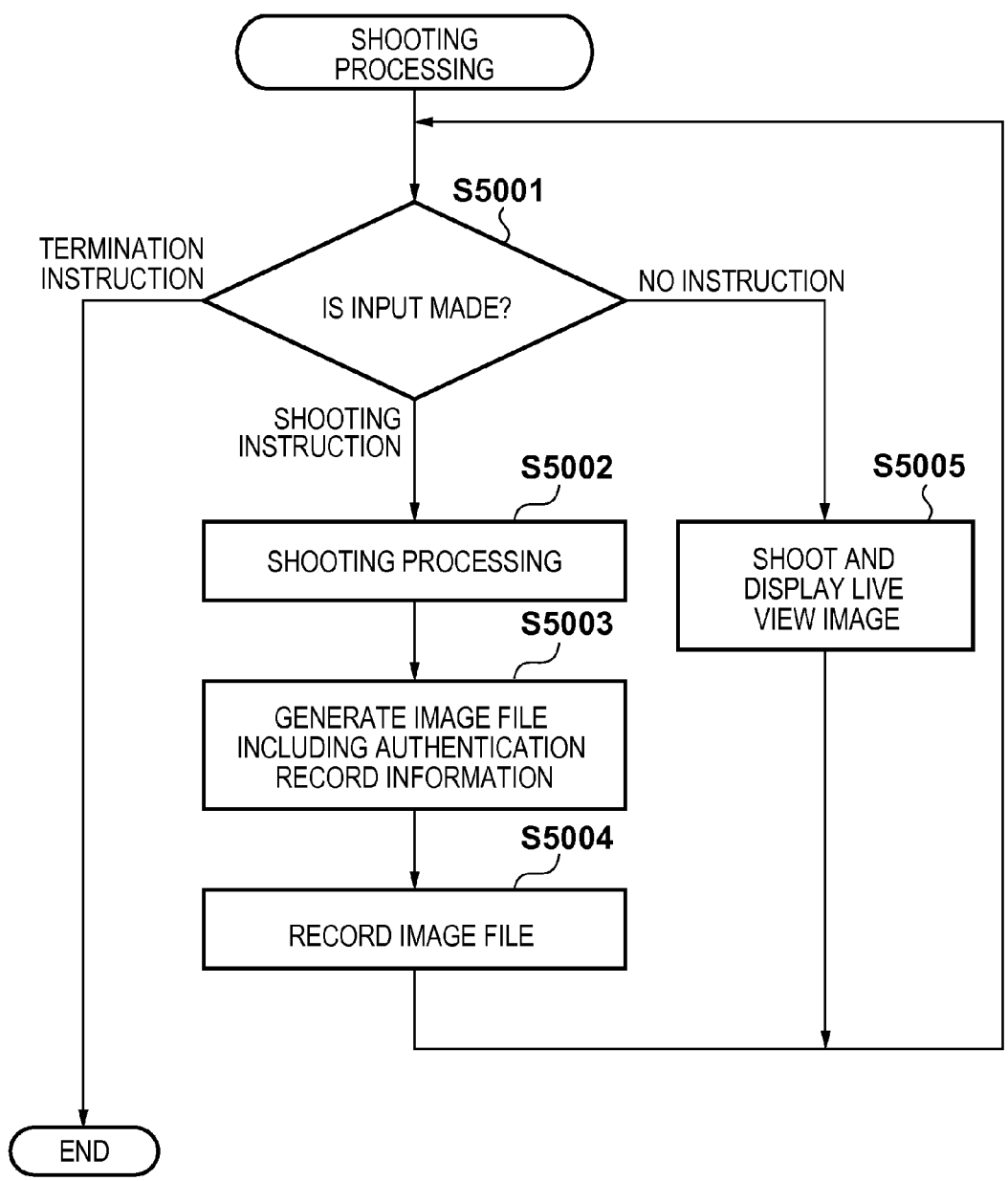
FIG. 5 is a flowchart illustrating an operation of image capture processing of the digital camera according to the embodiment.

The following will describe the operation of image capture processing of the digital camera according to the present embodiment with reference to the flowchart of FIG. 5. The image capture processing constitutes a part of the normal camera operation (S2005) of FIG. 2, and is executed when the digital camera is set to a shooting mode.

In step S5001, the MPU 1000 checks whether or not an input was made from the operation member 1002. If it is determined that an input was not made, the MPU 1000 advances the procedure to step S5005, where processing for shooting and displaying a live view image is performed, and returns the procedure to step S5001. If it is determined in step S5001 that a shooting instruction has been input from the operation member 1002, the MPU 1000 advances the procedure to step S5002. If it is determined in step S5001 that a termination instruction (for example, an instruction to switch the mode to another mode such as a reproducing mode) has been input, the MPU 1000 ends the image capture processing. Note that the input in step S5001 is not necessarily made via the operation member 1002, and may also be made via, for example, the communication device 1017.

Furthermore, a standard digital camera is configured such that a shooting preparation instruction is input prior to the shooting instruction, and the MPU 1000 selects the shooting conditions (shutter speed, diaphragm, and shooting sensitivity) in response to an input of the shooting preparation instruction. Furthermore, the MPU 1000 detects a focal point based on the contrast of the live view image or an output of an AF sensor.

In step S5002, the MPU 1000 executes image capture processing. The MPU 1000 controls, via the mechanism controller 1013, the operations of the shutter and the diaphragm so as to expose the image sensor 1012, reads image data from the image capture controller 1010 via the bus 1001, and stores the read image data in the volatile memory 1007. The MPU 1000 subjects the image data to white balance regulation processing, color interpolation processing, encoding processing or the like, so as to generate an image file. Note that, in the present embodiment, any well-known method may be used for the procedures from shooting in response to an input of the shooting instruction to generation of an image file.

In step S5003, the MPU 1000 reads information from the authentication state field 3001 and the authentication date and time field 3002 of the authentication record 3003 generated at the time of the most recent power-on. Then, the MPU 1000 adds the read information (authentication record information) to the image file stored in the volatile memory 1007, and then records the image file in the external storage device 1009 (S5004). Note that the authentication record information may be added to a metadata area (additional information area) provided in, for example, the header or the like of the image file, but may also be added to another area.

Time Series Authentication Data Display Processing

Figure 4A:
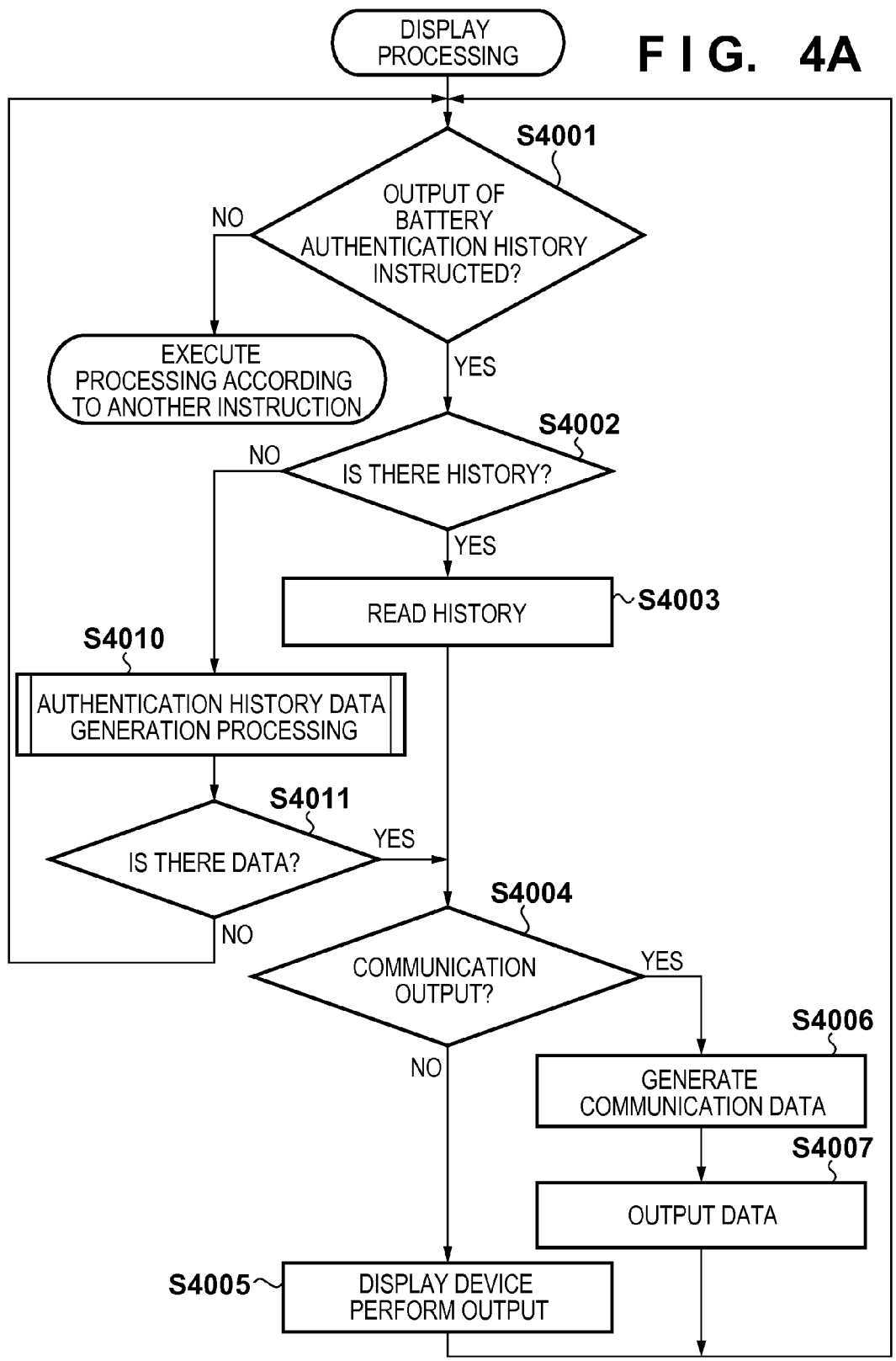
FIG. 4A is a flowchart illustrating an operation of time series authentication data display processing of the digital camera according to the embodiment.

The following will described the operation for displaying time series authentication data of the digital camera according to the present embodiment with reference to the flowchart shown in FIG. 4A. The time series authentication data display processing constitutes a part of the normal camera operation (S2005) of FIG. 2, and is executed when an instruction is input, for example, from the menu screen using the operation member 1002, or via the communication device 1017.

In step S4001, the MPU 1000 determines whether or not the instruction that was input from the operation member 1002 or the communication device 1017 is an instruction to output a battery authentication history. If it is another instruction, the MPU 1000 executes processing that corresponds to this instruction. If an instruction to output a battery authentication history is input, the MPU 1000 advances the procedure to step S4002, where it is checked whether or not the time series authentication data 3004 in the nonvolatile memory 1008 includes at least one authentication record 3003. If there is no authentication record 3003 or the time series authentication data 3004 is not accessible, the MPU 1000 advances the procedure to step S4010. If there is at least one authentication record 3003, the MPU 1000 reads, in step S4003, the time series authentication data 3004 from the nonvolatile memory 1008.

In step S4004, the MPU 1000 identifies whether an output destination of the time series authentication data 3004 is the display device 1005 or an external device (communication device 1017). For example, the MPU 1000 identifies that the output destination is an external device if the output instruction was input from the communication device 1017, and identifies that the output destination is the display device if the output instruction was input from the operation member 1002. Alternatively, the output destination may be designated by the instruction.

If it is identified that the output destination is the display device 1005, the MPU 1000 lets, in step S4005, the display device 1005 display the read time series authentication data 3004. Furthermore, if it is identified that the output destination is an external device, the MPU 1000 converts, in step S4006, the time series authentication data 3004 into a data format for communication with the external device (S4006), and then outputs the converted data via the communication device 1017 (S4007).

If another instruction is input while the display device 1005 displays the authentication history or after an output from the communication device 1017 has interfered, the MPU 1000 returns the procedure to step S4001.

On the other hand, if, in step S4002, the time series authentication data 3004 does not include the authentication record 3003 or the time series authentication data 3004 is not accessible, the MPU 1000 executes, in step S4010, authentication history data generation processing, which will be described below. In step S4011, the MPU 1000 determines whether or not authentication history data has been generated, and if authentication history data has been generated, the procedure advances to step S4004, and otherwise to step S4001.

Authentication History Data Generation Processing

Figure 4B:
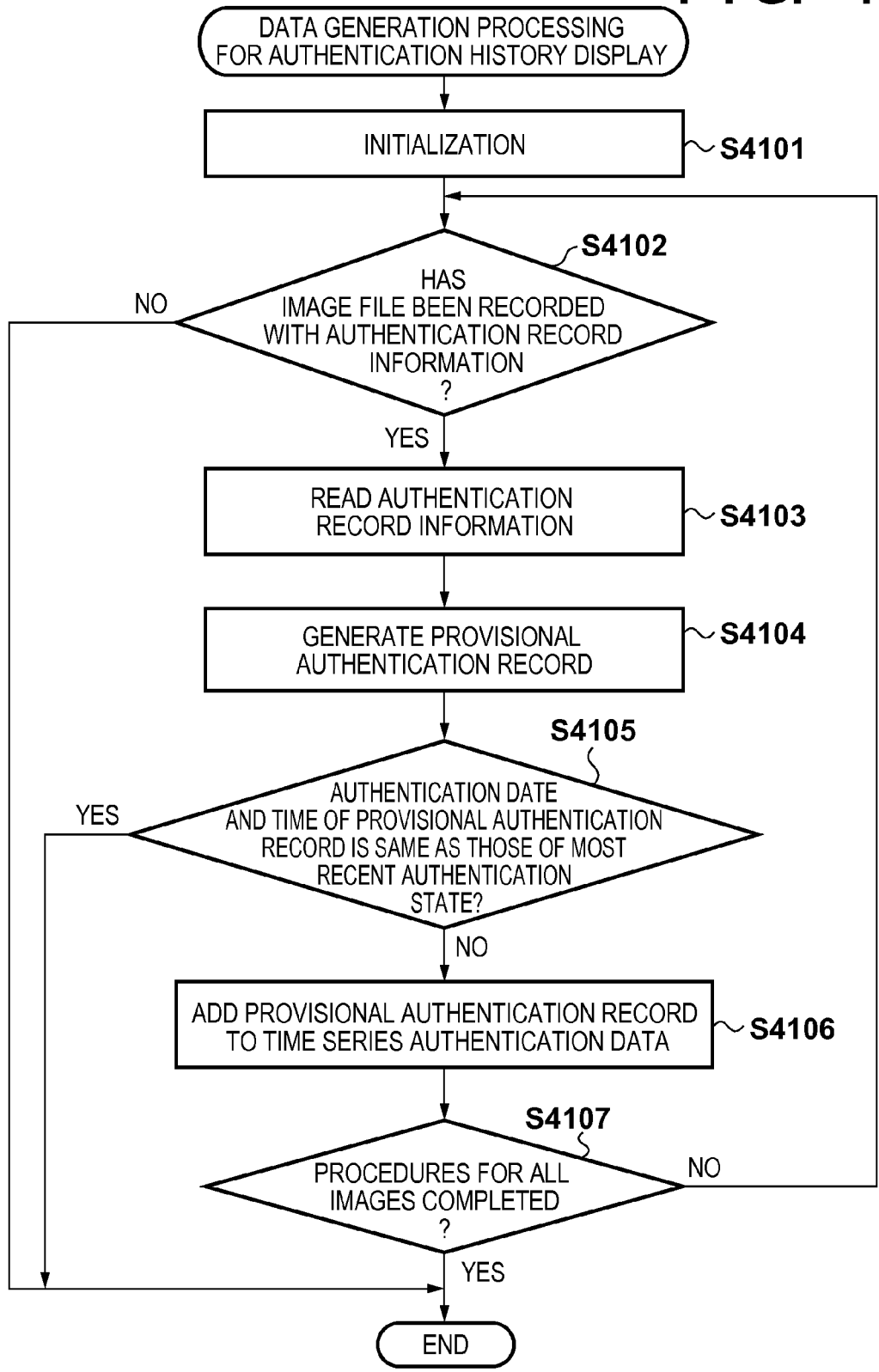
FIG. 4B is a flowchart illustrating an operation of authentication history data generation processing of the digital camera according to the embodiment.

The following will describe the authentication history data generation processing in step S4010 of FIG. 4A in detail with reference to the flowchart shown in FIG. 4B.

In step S4101, the MPU 1000 initializes an area in the volatile memory 1007 as an area in which time series authentication data and provisional authentication record are recorded. A provisional authentication record is for storing data in the same format as an authentication record 3003 before determining whether or not the stored data is to be added to the time series authentication data 3004 as an authentication record 3003. In other words, a provisional authentication record is a candidate for an authentication record 3003. Then, in step S4102, the MPU 1000 determines whether or not authentication record information has been recorded in the image file that has the oldest generation date, among the image files recorded in the nonvolatile memory 1008 and the external storage device 1009. If it is determined that the authentication record information has been recorded in the image file, the MPU 1000 advances the procedure to step S4103, and otherwise to step S4107.

In step S4103, the MPU 1000 reads the authentication record information (information representing the authentication state, and authentication date and time) recorded in the image file, and generates an authentication record (provisional authentication record) in the area for provisional authentication record of the volatile memory 1007 initialized in step S4101.

In step S4105, if the authentication date and time of the provisional authentication record generated in step S4104 are the same as the authentication date and time of the most recently generated provisional authentication record, the MPU 1000 discards the provisional authentication record generated in step S4104. This is because, if a plurality of images are captured from power-on to power-off, the plurality of images have recorded the same authentication record information. Then, if the authentication dates and times are not the same, the MPU 1000 compares the authentication state of the provisional authentication record generated in step S4104 with the authentication state of the most recently generated provisional authentication record, and if the authentication states are the same, the procedure advances to step S4107. Whereas, if the authentication states are different from each other, the MPU 1000 advances the procedure to step S4106, where the provisional authentication record generated in step S4104 is added, as a new authentication record 3003, in the area for time series authentication data of the volatile memory 1007 initialized in step S4101, and the procedure advances to step S4107. Note that a provisional authentication record whose authentication state is the same as that of the most recently generated provisional authentication record but whose authentication date is different from that of the most recently generated provisional authentication record may also be added to the time series authentication data.

In step S4107, the MPU 1000 identifies whether or not the procedures from steps S4102 onwards with respect to all the image files recorded in the nonvolatile memory 1008 and the external storage device 1009 have been completed. If the procedures of all the image files have not been completed, the procedures from steps S4102 onward with respect to the image file that has the next oldest generation date are continued, and if the procedures of all the image files have been completed, the authentication history data generation processing ends.

Modification 1

Note that the authentication history data generation processing described with reference to FIG. 4B may also be executed by, instead of the MPU 1000 of the digital camera, another device such as, for example, an information processing device. For example, the information processing device reads image data from the external storage device 1009, and the CPU or MPU of the information processing device may execute the processing, similarly to the MPU 1000 of the digital camera. For example, when a user wants to obtain a history of battery authentications that was recorded by an inoperative digital camera, it is possible for another digital camera or information processing device to generate time series authentication data based on the image file recorded in the external storage device 1009. Since generation of time series authentication data based on an image file is easy, this modification is advantageous in terms of discovering the cause of the malfunction.

Modification 2

Furthermore, although the present embodiment is configured such that only the most recently generated authentication record information is recorded in an image file, a configuration is also possible in which authentication record information that wasn't generated most recently is further recorded. For example, each authentication record 3003 of the time series authentication data 3004 is provided with a field in which information (e.g., a flag) representing whether or not that authentication record 3003 has been recorded in the image file is stored. When the most recently generated authentication record information is recorded in an image file generated by shooting, the MPU 1000 determines whether or not there is any authentication record 3003 of the time series authentication data 3004 that has not been recorded in the image file. If there is any authentication record that has not been recorded in the image file, the MPU 1000 reads the predetermined number (for example, one) of pieces of authentication record information, and records it in the image file. Furthermore, the fact that recording in the image file has been made is recorded in the field of the recorded authentication record. For example, it is possible to select authentication records that have not been recorded in the image file in order from oldest first, or to select, on a priority basis, the authentication record that has the authentication state showing that a non-genuine product is used (authentication failure). The authentication state showing that a non-genuine product is used can include, for example, at least the case where a non-genuine product is used with the user's understanding thereof, and may also include the case where use of a non-genuine product is suspended, in addition to the former case.

Recording of authentication field information in the image file is not executed unless shooting is performed. Therefore, in the configuration in which the most recently generated authentication record information is recorded in the image file, authentication record information in the case where shooting has not been performed between power-on and power-off is not recorded in an image file. However, according to the present modification, it is also possible to recover such authentication record information from the image file. Note that the number of authentication records whose information is recorded in the image file can be determined appropriately according to the size of an additional information area of the image file and the data size of the authentication record information, and doesn't need to be constant.

In the present modification, when time series authentication data is generated (recovered) based on the image file, pieces of authentication record information can be read from image files, sorted with respect to the authentication date and time, and then added to the time series authentication data in order from oldest first. Also in this case, the same authentication record information is discarded.

Therefore, according to the present embodiment, pieces of information on the authentication states and authentication dates and times of the used batteries are sequentially recorded, and thus it is possible to recognize the history of the authentication states. Furthermore, it is configured such that, when an image is captured, pieces of information on the authentication states and authentication dates and times of the used batteries are recorded in a data file of the captured image. Therefore, even in the case where it is difficult or impossible to access the storage device included in the image capture apparatus, such as when, for example, the image capture apparatus is inoperative, it is possible to recognize a history of the authentication states from the image file.

Second Embodiment

Figure 6:
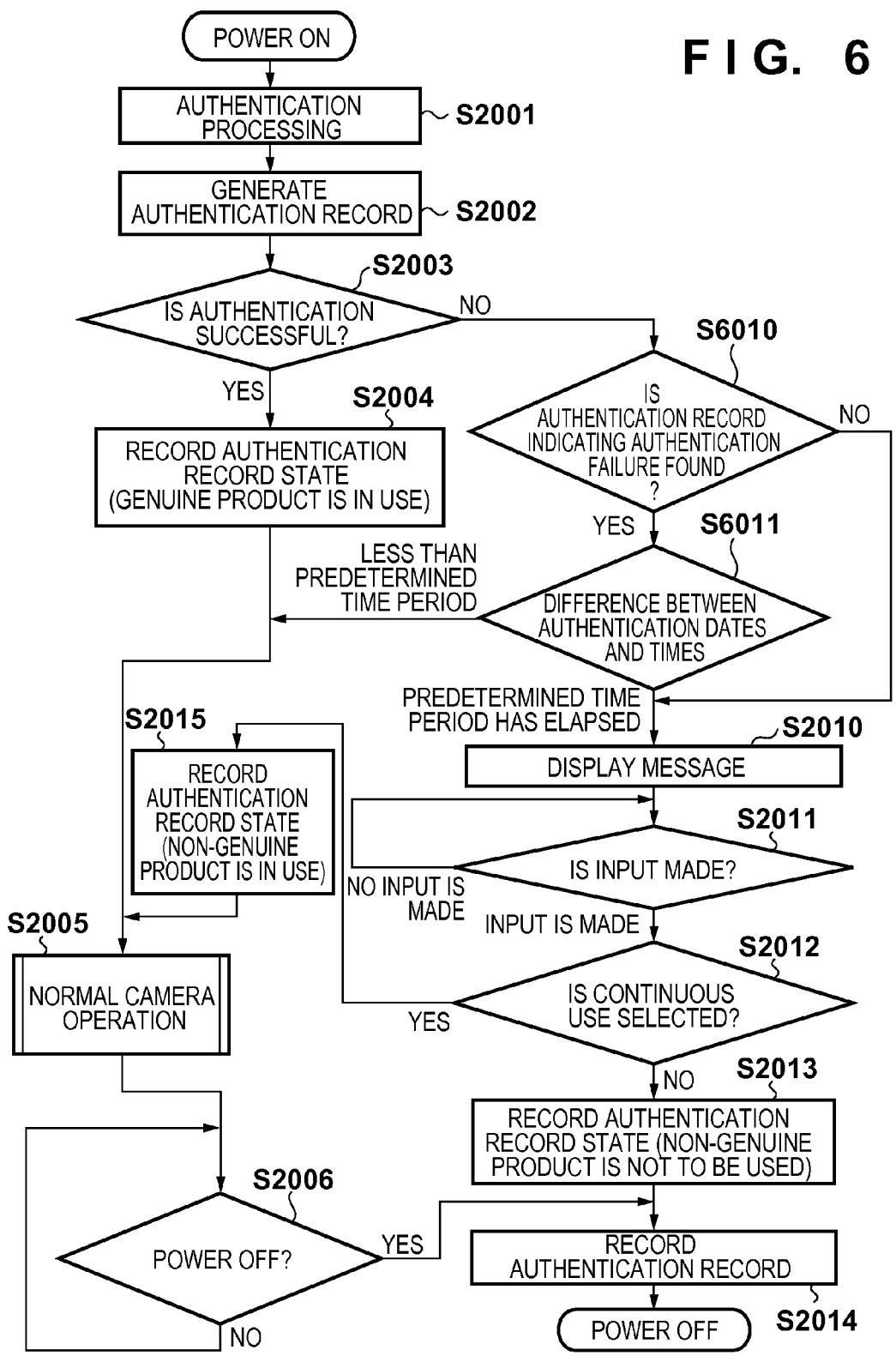
FIG. 6 is a flowchart illustrating an operation of battery authentication, of activation processing of a digital camera according to a second embodiment.

The following will describe the operation of battery authentication of activation processing of a digital camera, which is an example of an electronic apparatus according to a second embodiment of the present invention, with reference to the flowchart shown in FIG. 6. In the flowchart of FIG. 6, the same reference numerals are given to the same operation steps as those in the first embodiment, and redundant descriptions thereof are omitted.

The present embodiment differs from the first embodiment in that, if authentication results in a failure in step S2003, the procedure shifts to the normal camera operation without notifying the user that he or she is using a non-genuine product and asking the user whether or not he or she will continue using the battery, as long as the time period that has elapsed since the last failure in authentication processing is within a predetermined time period.

In step S2003, if it is determined that the authentication processing executed in step S2001 is successful, the MPU 1000 advances the procedure to step S2004, and if it is determined that the authentication processing fails, the MPU 1000 advances the procedure to step S6010.

In step S6010, the MPU 1000 refers to the time series authentication data 3004 in the nonvolatile memory 1008, and searches for the most recent authentication record 3003 in which the authentication failure is recorded. Specifically, the MPU 1000 searches for the most recent authentication record 3003 in which information representing that the user is using a non-genuine product with his/her understanding thereof or that use of a non-genuine product is suspended is stored in the authentication state.

If the time series authentication data 3004 does not include an authentication record in which authentication failure is recorded, the MPU 1000 advances the procedure to step S2010, and if the time series authentication data 3004 includes such an authentication record, the MPU 1000 advances the procedure to step S6011.

In step S6011, the MPU 1000 obtains information on the authentication date and time from the authentication date and time field 3002 of the authentication record 3003, compares the obtained information with the information stored in the authentication date and time field 3002 of the authentication record 3003 that was generated in step S2002, and calculates an elapsed time period. Then, if the time period that has elapsed since the most recent authentication failure is less than a predetermined time period, the MPU 1000 advances the procedure to step S2005, where the normal camera operation is started without the authentication record 3003 generated in step S2002 being added to the time series authentication data 3004. Here, the predetermined time period is not particularly limited, but may be a time period, for example, of several minutes to several tens of minutes.

On the other hand, if, in step S6011, the predetermined time period or more has elapsed since the most recent authentication failure, the MPU 1000 advances the procedure to step S2010. The procedures from steps S2010 onward are the same as those in the first embodiment, and thus descriptions thereof are omitted.

According to the present embodiment, if the time period that has elapsed since the most recent authentication failure is less than a predetermined time period, the normal camera operation is started without notifying the user that he or she is using a non-genuine product and asking the user whether or not he or she will continue using the battery. Therefore, if a non-genuine product is used, it is possible to prevent the user from being bothered, by being notified and asked each time power is on.

Note that, although description is given assuming that an authentication record is not recorded as well if the time period that has elapsed since the most recent authentication failure is less than a predetermined time period, recording of an authentication record may also be performed. In this case, the user is not asked as to whether or not he or she will continue using the battery, and thus information representing an authentication failure (without the user being asked as to whether or not he or she will continue using the battery) is stored in the authentication state.

Third Embodiment

Figure 7:
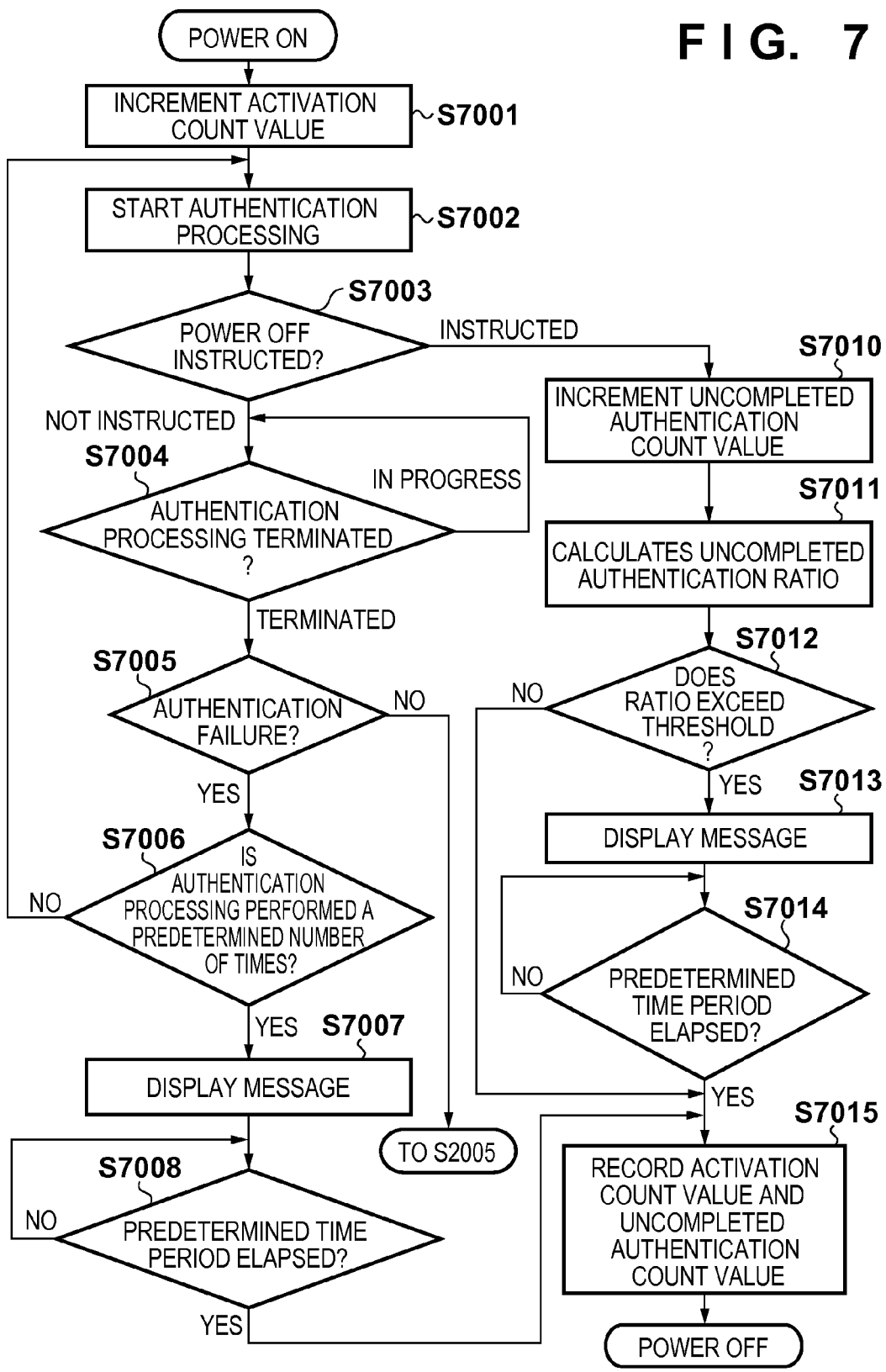
FIG. 7 is a flowchart illustrating an operation of battery authentication, of activation processing of a digital camera according to a third embodiment.

The following will describe the operation of battery authentication of activation processing of a digital camera, which is an example of an electronic apparatus according to a third embodiment of the present invention, with reference to the flowchart shown in FIG. 7.

The present embodiment is such that, even when the user instructs to turn off the power before battery authentication processing is completed, the user is notified and reminded that he or she is using a non-genuine product using the time series authentication data 3004. For example, in the case where authentication processing takes time, a power-off instruction before authentication processing is completed will unavoidably turn off the power before an authentication result is obtained, and thus conventionally, even when a non-genuine product is used, it is not possible to notify the user of the fact. Examples of the case where authentication processing takes time include a case where it is set that authentication processing is repeated a predetermined plurality of times before the authentication processing is determined as a "failure". In this case, although determining that the authentication processing is "successful" does not take time, an instruction to turn off the power may be input before the authentication processing is determined as a "failure". Furthermore, also in the case where it is set that authentication processing that requires a large amount of data and takes a long communication time is performed a plurality of times, as authentication processing using a public key, it takes a long time until the authentication processing is completed. Note that authentication processing may also be executed a plurality of times in order to be determined as not only a "failure" but also a "success".

If power-on is instructed by an operation of the power supply button of the operation member 1002 or the like, the MPU 1000 lets the power supply controller 1003 supply power to the components. The MPU 1000 reads an activation count value stored in the nonvolatile memory 1008, increments the value by one (+1), and stores the incremented value in the volatile memory 1007 (S7001).

Then, the MPU 1000 communicates with the authentication unit 1100 of the battery 1004 via the power supply controller 1003, and starts authentication processing for determining whether or not the mounted battery 1004 is a genuine product (S7002).

In step S7003, the MPU 1000 determines whether or not an instruction to turn off the power has been input from the operation member 1002, and if it is determined that such an instruction has been input, the procedure advances to step S7010, and if it is determined that such an instruction has not been input, the procedure advances to step S7004.

In step S7004, the MPU 1000 communicates with the power supply controller 1003, and determines whether or not the authentication processing is completed. If the MPU 1000 itself executes the authentication processing, the MPU 1000 does not need to communicate with the power supply controller. If it is determined that the authentication processing is in progress, the MPU 1000 returns the procedure to step S7003, and if it is determined that the continuous processing is completed, the MPU 1000 advances the procedure to step S7005.

Then, in step S7005, the MPU 1000 determines whether or not the authentication results in a success, and if it is determined that the authentication results in a success, the procedure advances to step S2005 of FIG. 2 to start the normal camera operation. On the other hand, if it is determined that the authentication results in a failure, the MPU 1000 advances the procedure to step S7006, where it is determined whether or not the authentication processing has been performed a predetermined number of times. Here, the predetermined number of times is the number of times in which the authentication processing is performed repeatedly, typically about three to five times, taking into consideration a possible failure in authentication due to defective contact of hardware or the like even in the case where a genuine battery product is used.

If it is determined in step S7006 that the authentication processing has not been performed repeatedly a predetermined number of times, the MPU 1000 returns the procedure to step S7002, where authentication processing is performed again. If it is determined in step S7006 that the authentication processing has been performed repeatedly a predetermined number of times, the MPU 1000 advances the procedure to step S7007, where the display device 1005 displays a message for notifying that the battery is not a genuine product, stands by until a predetermined time period elapses (S7008), and turns off the power. Note that it is also possible to perform, instead of turning off the power, the procedure from steps S2012 onward of the first embodiment or second embodiment.

If it is determined in step S7003 that an instruction to turn off the power has been input from the operation member 1002, the MPU 1000 reads, in step S7010, an uncompleted authentication count value stored in the nonvolatile memory 1008, increments the value, and stores the incremented value in the volatile memory 1007.

Then, in step S7011, the MPU 1000 calculates the ratio of an uncompleted authentication count to the total activation count, based on the activation count value stored in step S7001 and the uncompleted authentication count value stored in step S7010. Here, the uncompleted authentication count is the number of times in which power is turned off before authentication processing is completed. Then, the MPU 1000 determines whether or not the ratio of the uncompleted authentication count to the total activation count exceeds a predetermined threshold (S7012), and if the ratio exceeds a predetermined threshold, the procedure advances to step S7013, and otherwise to step S7015.

In step S7013, the MPU 1000 displays, on the display device 1005, a message that notifies of the risk when the battery 1004 in use is a non-genuine product, and stands by until a predetermined time period elapses (S7014). Here, the MPU 1000 may also stand by until an input that the user recognizes the message is made via the operation member 1002, instead of standing by until the time period elapses.

In step S7015, the MPU 1000 updates the activation count value and uncompleted authentication count value that are recorded in the nonvolatile memory 1008, by overwriting them with the activation count value and uncompleted authentication count value that are stored in the volatile memory 1007, and then turns off the power.

According to the present embodiment, even when power is turned off upon an instruction input before an authentication result is obtained, it is possible to remind the user of the risk when a non-genuine battery product is used, as long as the ratio of the count of power-off before an authentication result is obtained to the total activation count is a threshold or more.

Note that, if at least one "failure" in authentication processing is obtained at the time at which an input of an instruction to turn off the power is detected (an instruction to turn off the power is input during re-execution of the authentication processing), it is also possible to display, in step S7013, a message indicating that a non-genuine product is in use.

Other Embodiments

Note that the foregoing embodiments have described the cases where battery authentication processing is performed at the time of power-on (activation), but the battery authentication processing may also be performed at another timing.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-270129, filed Dec. 26, 2013, which is hereby incorporated by reference herein in its entirety.

What is claimed is:

1. An electronic apparatus comprising:
a memory storing instructions which, when executed by one or more processors, cause the electronic apparatus to:
output image data in response to a shooting instruction;
perform authentication process for identifying whether or not a battery that is used in the electronic apparatus is a genuine product;
generate authentication data that includes information representing a time when the authentication processing is performed, and information representing a result of the authentication processing;
generate an image file based on the output image data; and
record the image file in at least one of a recording medium that is removable from the electronic apparatus and an external device with which the electronic apparatus is communicable,
wherein the authentication data is stored into the image file.

2. The electronic apparatus according to claim 1, the instructions, when executed by one or more processors, further cause the electronic apparatus to:
store the authentication data in an internal storage device in a time series manner.

3. The electronic apparatus according to claim 1,
wherein the authentication process identifies that the battery is a non-genuine product if the authentication processing fails, and
the instructions further cause the electronic apparatus to notify a user that the battery is a non-genuine product if the battery is identified as a non-genuine product.

4. The electronic apparatus according to claim 3,
wherein, if the battery is identified as a non-genuine product, the instructions causes the electronic apparatus not to perform the notification if a time period that has elapsed since the most recent determination that the battery is a non-genuine product is less than a predetermined time period.

5. The electronic apparatus according to claim 3,
wherein, if power-off of the electronic apparatus is instructed before the authentication processing is completed, the instructions further causes the electronic apparatus to calculate a ratio of a count of uncompleted authentication in which the electronic apparatus is powered off before the authentication processing is completed to a count of activation of the electronic apparatus, perform the notification if the ratio exceeds a predetermined ratio, and not to perform the notification if the ratio does not exceed the predetermined ratio.

6. The electronic apparatus according to claim 1,
wherein, if it is identified that the battery is a non-genuine product, the instruction further causes the electronic apparatus to:
receive an instruction to continue or stop using the battery, and
generate the authentication data including information according to the received instruction as the information representing the result of the authentication processing.

7. The electronic apparatus according to claim 1, the instructions further cause the electronic apparatus to:
generate time series authentication data indicating a history of the authentication processing performed in the electronic apparatus, based on the authentication data recorded in the image file recorded in the recording medium.

8. The electronic apparatus according to claim 7,
wherein, for each piece of authentication data recorded in a plurality of image files, if the authentication data has different information representing a result of the authentication processing from that of authentication data generated in authentication processing performed immediately before the authentication processing in which that piece of authentication data was generated, the instructions further causes the electronic apparatus to add the history to the time series authentication data.

9. A method for controlling an electronic apparatus including an image capture unit configured to output image data in response to a shooting instruction, comprising:
performing authentication processing for identifying whether or not a battery that is used in the electronic apparatus is a genuine product;
generating authentication data that includes information representing a time when the authentication processing is performed, and information representing a result of the authentication processing;
generating an image file based on the image data that was output by the image capture unit; and
recording the image file in at least one of a recording medium that is removable from the electronic apparatus and an external device with which the electronic apparatus is communicable,
wherein, in the generating the image file, the authentication data is stored into the image file.

10. A non-transitory computer-readable storage medium having stored therein a program for causing a computer having an image capture unit configured to output image data in response to a shooting instruction to:
perform authentication processing for identifying whether or not a battery that is used in the electronic apparatus is a genuine product;
generate authentication data that includes information representing a time when the authentication processing is performed, and information representing a result of the authentication processing;
generate an image file based on the image data that was output by the image capture unit; and
record the image file in at least one of a recording medium that is removable from the electronic apparatus and an external device with which the electronic apparatus is communicable,
wherein the authentication data is stored into the image file.

* * * * *